(12) United States Patent
Bramley

(10) Patent No.: US 7,266,291 B2
(45) Date of Patent: Sep. 4, 2007

(54) METHOD FOR PROCESSING AUDIO/VIDEO DATA WITHIN AN AUDIO/VIDEO DISK DRIVE, AND CORRESPONDING DRIVE

(75) Inventor: Richard Bramley, Grenoble (FR)

(73) Assignee: STMicroelectronics SA, Montrogue (FR)

( * ) Notice: Subject to any disclaimer, the term of this patent is extended or adjusted under 35 U.S.C. 154(b) by 935 days.

(21) Appl. No.: 10/650,273

(22) Filed: Aug. 28, 2003

(65) Prior Publication Data

US 2005/0249483 A1 Nov. 10, 2005

(30) Foreign Application Priority Data

Sep. 4, 2002 (FR) .................................. 02 10910

(51) Int. Cl.
*H04N 5/00* (2006.01)
*H04N 11/02* (2006.01)
*H04N 7/26* (2006.01)

(52) U.S. Cl. ........................ 386/125; 386/33; 386/111; 386/112

(58) Field of Classification Search .................. 386/33, 386/111–112, 125; 709/203
See application file for complete search history.

(56) References Cited

U.S. PATENT DOCUMENTS 6,377,628 B1 4/2002 Schultz et al. ......... 375/240.26

2002/0039149 A1 4/2002 Perez ........................ 348/469
2006/0294183 A1* 12/2006 Agnoli et al. ............... 709/203

FOREIGN PATENT DOCUMENTS

EP 1109408 6/2001
WO 98/27720 6/1998

* cited by examiner

*Primary Examiner*—Thai Q. Tran
*Assistant Examiner*—Hung Dang
(74) *Attorney, Agent, or Firm*—Lisa K. Jorgenson; Allen, Dyer, Doppelt, Milbrath & Gilchrist, P.A.

(57) ABSTRACT

A disk drive is equipped with an electronic chip that includes a main processor capable of decoding data compressed according to a first compression standard and an input/output interface, for example an external memory interface with a predetermined maximum data transfer rate. When encountering data compressed according to a second compression standard having a compressed data rate less than the maximum transfer rate of the generic interface and having a decoded data rate greater than the maximum data transfer rate, the compressed data are transferred to an auxiliary processor through the generic external memory interface. The compressed data are decoded within the auxiliary processor, and the decoded data are then re-encoded according to the first compression standard, which are then transferred to the main processor for decoding according to the first compression standard.

21 Claims, 3 Drawing Sheets

METHOD FOR PROCESSING AUDIO/VIDEO DATA WITHIN AN AUDIO/VIDEO DISK DRIVE, AND CORRESPONDING DRIVE

FIELD OF THE INVENTION

The present invention relates to processing audio/video data, and more particularly, to decoding data compressed according to the MPEG4 compression standard.

BACKGROUND OF THE INVENTION

At the present time, multi-function digital disk drives, and particularly audio/video disk drives (for DVD disks) are designed to decode data compressed according to the MPEG2 standard. It is also possible to have digital disks, for example CD ROM disks, containing audio/video data compressed according to the MPEG4 standard.

SUMMARY OF THE INVENTION

In view of the foregoing background, an object of the present invention is to use a DVD disk drive to decode data according to the MPEG4 standard, even if the drive was not originally designed to decode such data. This is done without the need to modify the decoding software already installed on the DVD drive. In particular, the installed software may be designed to decode data compressed according to the MPEG2 standard.

This and other objects, advantages and features in accordance with the present invention are provided by a method for processing audio/video data in an audio/video disk drive in which the drive is equipped with an electronic chip comprising main processing means for decoding data compressed according to a first compression standard, for example the MPEG2 standard, and an input/output interface, for example a generic external memory interface with a maximum predetermined data transfer rate.

According to one general characteristic of the invention, when encountering data compressed according to a second compression standard, for example the MPEG4 standard defining a compressed data rate that is less than the maximum transfer rate of the input/output interface and a decoded data rate greater than the maximum transfer rate, the compressed data are transferred to the auxiliary processing means through the input/output interface. The compressed data are decoded within the auxiliary processing means, and the decoded data are then encoded according to the first compression standard. The data thus encoded are transferred to the main processing means for decoding.

In other words, the invention uses an input/output interface not designed for this purpose as the means of transferring compressed data, for example an external memory interface normally designed to connect the additional memory to the main processing means. The method decodes data compressed for example according to the MPEG4 standard, external to the main processing means in the DVD disk drive, and then re-encodes the decoded data according to the MPEG2 standard before transferring the data through the memory interface for decoding in the main processing means.

According to one embodiment, the auxiliary processing means can only encode "intral" images with a lower compression ratio, and with a simpler encoding.

Another aspect of the present invention is directed to an audio/video disk drive comprising reception means capable of receiving an audio/video digital disk, an electronic chip connected to the reception means and comprising main processing means for decoding data compressed according to a first compression standard, and an input/output interface, for example a generic external memory interface with a predetermined maximum data transfer rate.

According to one general characteristic of the invention, the digital audio/video disk may contain data compressed according to a second compression standard defining a compressed data rate less than the generic interface transfer rate, and defining a decoded data rate greater than the transfer rate. The drive may comprise auxiliary processing means connected to the input/output interface for decoding data compressed according to the second compression standard, and for encoding data decoded according to the first transmission standard. The main processing means may transfer data compressed according to the second compression standard through the input/output interface, and then decode the corresponding data encoded according to the first compression standard by the auxiliary processing means, and then transfers the decoded data through the input/output interface.

BRIEF DESCRIPTION OF THE DRAWINGS

Other advantages and characteristics of the invention will become clear after reading the detailed description of an embodiment and method of use that is in no way restrictive, with reference to the appended drawings, wherein.

DETAILED DESCRIPTION OF THE PREFERRED EMBODIMENTS

Figure 1:
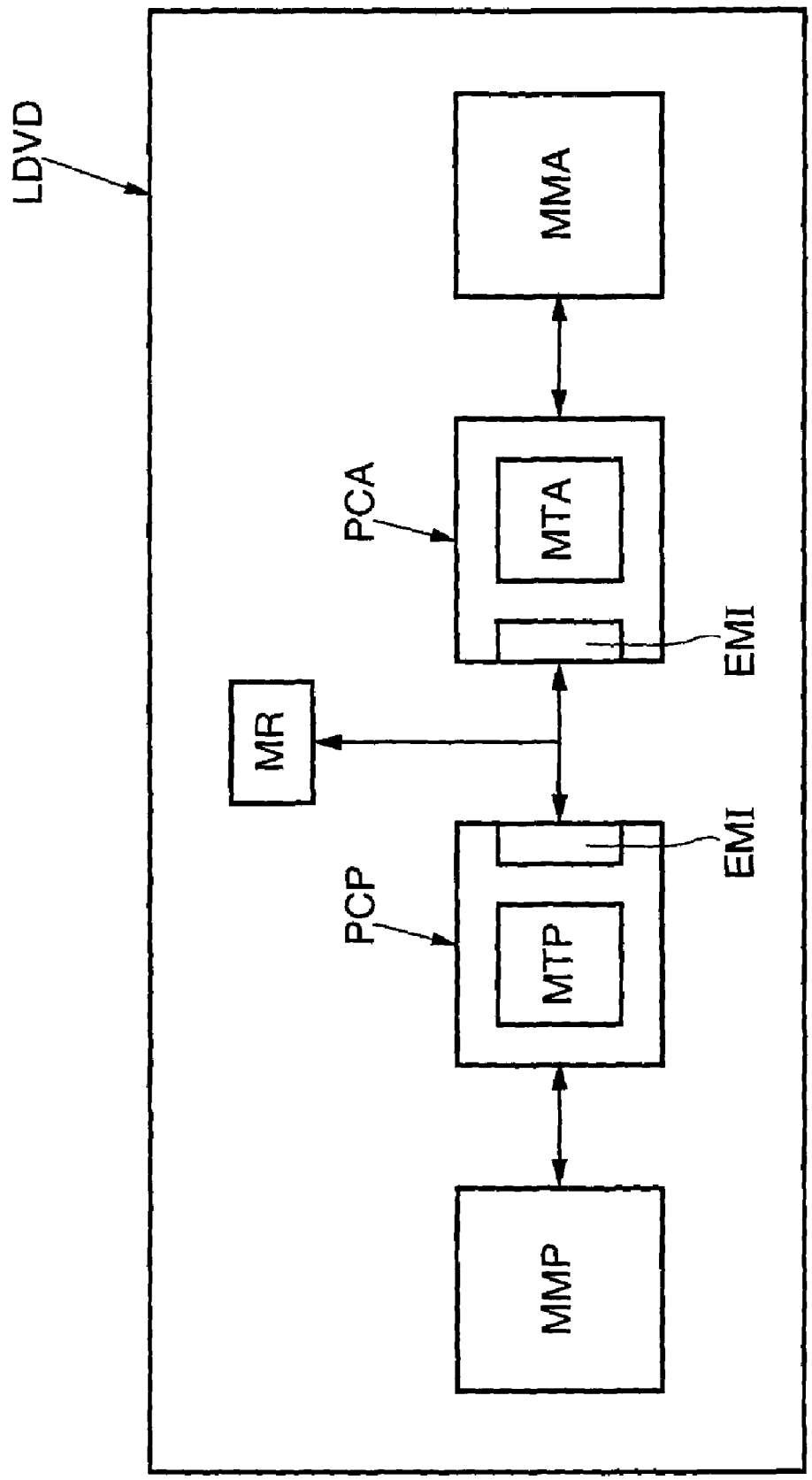
FIG. 1 diagrammatically illustrates the internal architecture of a drive according to the present invention.

In FIG. 1, the LDVD reference denotes a DVD. Conventionally, it comprises reception means MR (specific interface) used to receive the digital disk, and a main chip PCP comprising main processing means MTP implemented by software within a processor. In this case, the main processing means MTP are capable of decoding data compressed according to the MPEG2 standard.

The main processing means MTP interfaces with a video memory MMP. In this example, the main chip PCP also comprises a generic external memory interface EMI that was originally intended to hold the additional memory.

The DVD drive according to the invention further comprises an additional chip PCA also equipped with an EMI interface compatible with the EMI interface of the main chip PCP. The additional chip PCA also comprises auxiliary processing means MTA for decoding data compressed according to the MPEG4 standard, and for re-encoding the data according to the MPEG2 standard. In this respect, an additional video memory MMA is provided.

In general, the rate transferred through the EMI interface is very limited. Thus, for example, a maximum data transfer rate may be on the order of 10 Mbytes/s. Furthermore, images compressed according to the MPEG4 standard use a compressed data rate on the order of 1 to 2 Mbytes/s. However after decoding, the decoded data rate is 30 Mbytes/s.

Furthermore, in the presence of a DVD disk inserted in the reception means MR and containing data compressed according to the MPEG4 standard, the main processing means MTP will recover the data and then transfer the data to the additional chip PCA through the generic external memory interface EMI. This is possible since the transfer rate of data compressed according to the MPEG4 order is less than the maximum data transfer rate through the EMI interface. Upon reception of the data encoded according to the MPEG4 standard, the auxiliary processing means MTA will decode the data and will then re-encode the data according to the MPEG2 standard.

The transfer rate of data compressed according to the MPEG2 standard is on the order of 7 Mbits/s. Therefore, this transfer rate is much less than the maximum transfer rate through the EMI interface. Data encoded according to the MPEG2 standard are then returned to the main chip PCP to be decoded by the main processing means MTP.

Thus, the invention enables decoding of data compressed according to the MPEG4 standard without any change to software already present in the main processing means MTP which is provided to only decode data compressed according to the MPEG2 standard.

Figure 2:
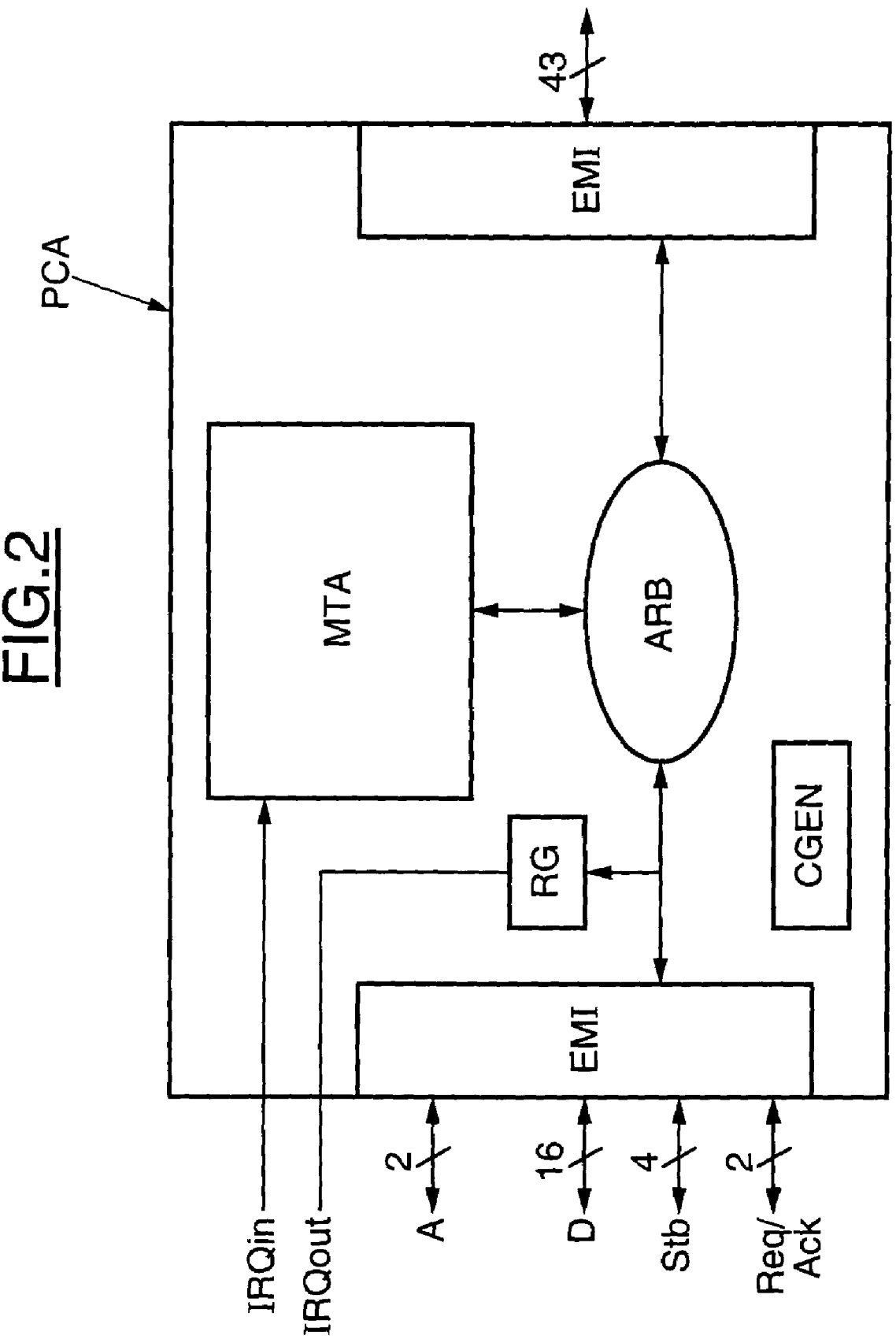
FIG. 2 illustrates in more detail the internal architecture of an additional component according to the present invention built into the drive.

As illustrated in FIG. 2, the auxiliary processing means MTA may be implemented by software within a processor, for example. Furthermore, it is intended that conventional arbitration means ARB will arbitrate between the main processing means MTP and the auxiliary processing means MTA.

A clock generator CGEN outputs the clock signal(s) necessary for correct operation of the PCA chip. Furthermore, an interface is provided with the additional video memory MMA, in addition to the EMI interface with the main processing means MTP. Finally, a register RG will be used to temporarily store the IRQout interrupts output by the auxiliary processing means MTA.

The auxiliary chip PCA also receives the interrupts IRQin output by the main processing means MTP and the addresses A of the video memory. The letter D denotes the data bus and the references STB, REQ, ACK denote conventional control signals between processors.

Figure 3:
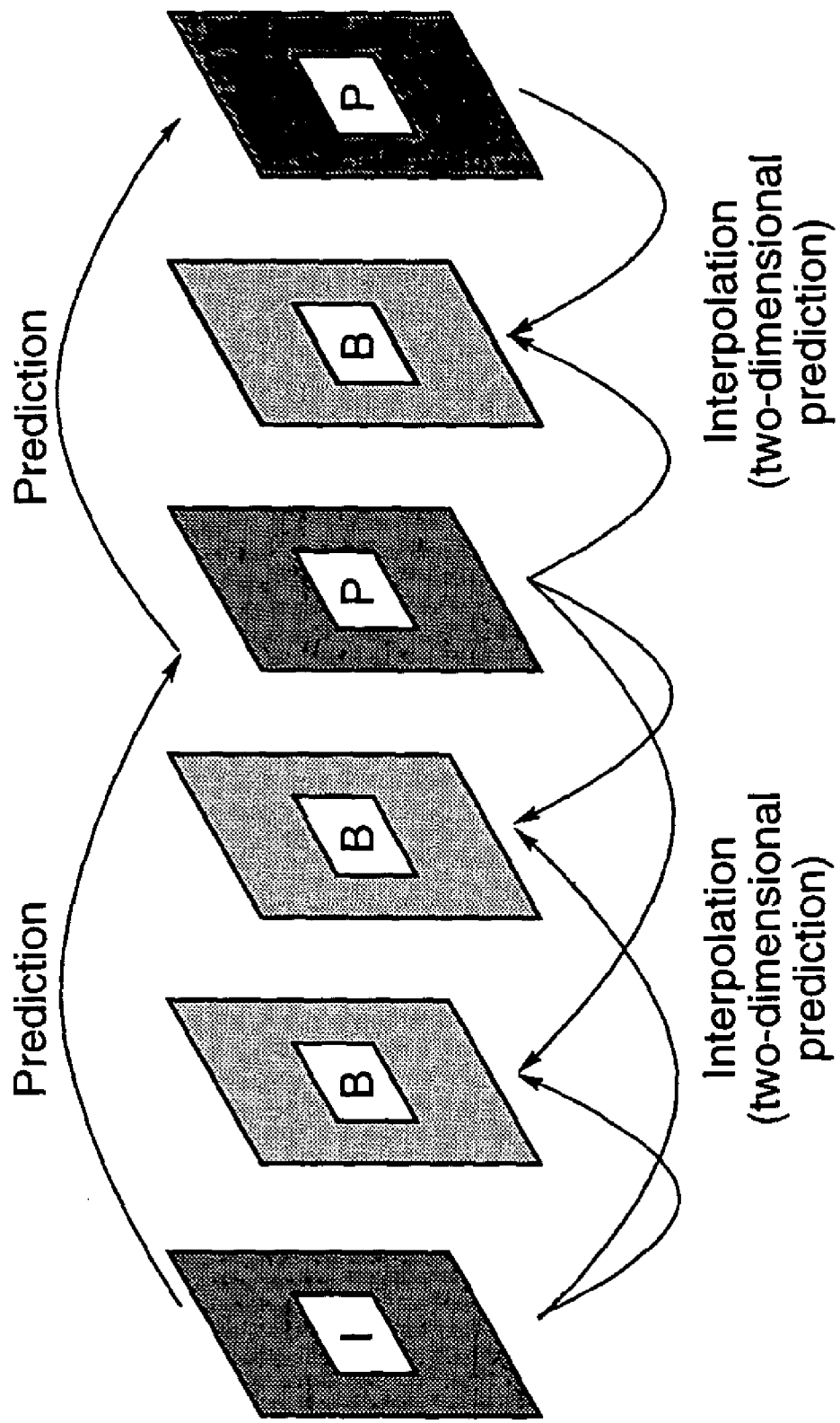
FIG. 3 shows the image types used in the MPEG standard.

The MPEG standard defines three types of images that are sequenced according to the diagram shown in FIG. 3. More precisely, the images I (intra) are encoded without any reference to the other images. In other words, they contain all elements necessary for reconstruction by the decoder. The compression ratio of the images I is relatively low.

The other images are P (predicted) images that are encoded with respect to the I or P type image described above using prediction techniques with movement compensation. Finally, the B (two-directional) images are encoded by interpolation between the previous and following I or P type images that surround them.

Since the compression ratio of the I images is relatively low, it is easier to encode them by the auxiliary processing means MTA. For example, this is why it would be possible to re-encode the decoded images using the I images only. This will give a higher rate of encoded images than if encoding was done using I, P and B images according to the standard. However, this transfer rate of encoded I images will remain largely compatible with the maximum transfer rate of the EMI interface.

That which is claimed is:

1. A method for processing audio/video data within an audio/video disk drive comprising a reception interface for receiving a digital audio/video disk containing data compressed according to at least one of a first compression standard and a second compression standard, the second compression standard having a compressed data rate less than a predetermined data transfer rate and having a decoded data rate greater than the predetermined data transfer rate, the method comprising:

transferring compressed data from the digital audio/video disk to an electronic chip connected to the reception interface, the electronic chip comprising main processing means for decoding the data if compressed according to the first compression standard, and an input/output interface supporting the predetermined data transfer rate, and if the data is compressed according to the second compression standard, then the electronic chip transfers the data through the input/output interface; and receiving the transferred data by auxiliary processing means connected to the input/output interface, the auxiliary processing means performing the following
  decoding the data according to the second compression standard,
  re-encoding the decoded data according to the first compression standard, and
  transferring the re-encoded data to the electronic chip for decoding according to the first compression standard.

2. A method according to claim 1, wherein the first compression standard is based upon the MPEG2 standard; and wherein the second compression standard is based upon the MPEG4 standard.

3. A method according to claim 1, wherein the auxiliary processing means only encodes intra images.

4. A method according to claim 1, wherein the input/output interface is a generic external memory interface.

5. A method for processing data within a disk drive comprising an interface for receiving a disk containing data compressed according to at least one of a first compression standard and a second compression standard, the second compression standard having a compressed data rate less than a predetermined data transfer rate and having a decoded data rate greater than the predetermined data transfer rate, the method comprising:

transferring compressed data from the disk to a main processor connected to the interface, the main processor for decoding the data if compressed according to the first compression standard, and comprises an input/output interface supporting the predetermined data transfer rate, and if the data is compressed according to the second compression standard, then the main processor transfers the data through the input/output interface; and receiving the transferred data by an auxiliary processor connected to the input/output interface, the auxiliary processor performing the following
  decoding the data according to the second compression standard,
  re-encoding the decoded data according to the first compression standard, and
  transferring the re-encoded data to the main processor decoding according to the first compression standard.

6. A method according to claim 5, wherein the auxiliary processor only encodes intra images.

7. A method according to claim 5, wherein the disk comprises a digital video disk (DVD).

8. A method according to claim 5, wherein the first compression standard is based upon the MPEG2 standard; and wherein the second compression standard is based upon the MPEG4 standard.

9. A method according to claim 5, wherein the input/output interface is a generic external memory interface.

10. A method according to claim 5, wherein the auxiliary processor comprises an input/output interface for exchanging data with the input/output interface of the main processor.

11. An audio/video disk drive comprising: reception means for receiving a digital audio/video disk containing data compressed according to at least one of a first compression standard and a second compression standard, the second compression standard having a compressed data rate less than a predetermined data transfer rate and having a decoded data rate greater than the predetermined data transfer rate;
- an electronic chip connected to said reception means for receiving the data compressed according to the first or second compression standard, said electronic chip comprising main processing means for decoding the received data if compressed according to the first compression standard, and an input/output interface supporting the predetermined data transfer rate, and if the received data is compressed according to the second compression standard, then said electronic chip transfers the received data compressed according to the second compression standard through said input/output interface; and
- auxiliary processing means connected to said input/output interface for receiving the transferred data, said auxiliary processing means
  - decoding the received data according to the second compression standard,
  - re-encoding the decoded data according to the first compression standard, and
  - transferring the re-encoded data to said electronic chip for decoding according to the first compression standard.

12. An audio/video disk drive according to claim 11, wherein the first compression standard is based upon the MPEG2 standard; and wherein the second compression standard is based upon the MPEG4 standard.

13. An audio/video disk drive according to claim 11, wherein said auxiliary processing means only encodes intra images.

14. An audio/video disk drive according to claim 11, wherein said input/output interface is a generic external memory interface.

15. An audio/video disk drive according to claim 11, further comprising a second input/output interface that is compatible with said input/output interface of said electronic chip; and wherein said auxiliary processing means are connected to said second input/output interface for exchanging data with said main processing means.

16. A disk drive comprising:
- an interface for receiving a disk containing data compressed according to at least one of a first compression standard and a second compression standard, the second compression standard having a compressed data rate less than a predetermined data transfer rate and having a decoded data rate greater than the predetermined data transfer rate;
- a main processor connected to said interface for receiving the data compressed according to the first or second compression standard, said main processor for decoding the received data if compressed according to the first compression standard, and comprising an input/output interface supporting the predetermined data transfer rate, and if the received data is compressed according to the second compression standard, then said main processor transfers the received data compressed according to the second compression standard through said input/output interface; and
- an auxiliary processor connected to said input/output interface for receiving the transferred data, said auxiliary processor
  - decoding the received data according to the second compression standard,
  - re-encoding the decoded data according to the first compression standard, and
  - transferring the re-encoded data to said main processor for decoding according to the first compression standard.

17. A disk drive according to claim 16, wherein said auxiliary processor only encodes intra images.

18. A disk drive according to claim 16, wherein the disk comprises a digital video disk (DVD).

19. A disk drive according to claim 16, wherein the first compression standard is based upon the MPEG2 standard; and wherein the second compression standard is based upon the MPEG4 standard.

20. A disk drive according to claim 16, wherein said input/output interface is a generic external memory interface.

21. A disk drive according to claim 16, wherein said auxiliary processor comprises an input/output interface for exchanging data with said input/output interface of said main processor.

* * * * *

UNITED STATES PATENT AND TRADEMARK OFFICE
CERTIFICATE OF CORRECTION

PATENT NO. : 7,266,291 B2
APPLICATION NO. : 10/650273
DATED : September 4, 2007
INVENTOR(S) : Bramley It is certified that error appears in the above-identified patent and that said Letters Patent is hereby corrected as shown below:

Cover page item (73)     Delete: "Montrogue"
                         Insert: -- Montrouge --

Column 1, Line 63        Delete: "intral"
                         Insert: -- intra --

Column 5, Line 7         Delete: "comprising: reception"
                         Insert: -- comprising:
                                     reception --

Signed and Sealed this

Sixth Day of May, 2008

JON W. DUDAS
*Director of the United States Patent and Trademark Office*